United States Patent
Casal Kulzer et al.

(10) Patent No.: US 8,532,909 B2
(45) Date of Patent: Sep. 10, 2013

(54) PROCEDURE AND CONTROL UNIT FOR OPERATING A SELF-IGNITING OTTO ENGINE

(75) Inventors: Andre F Casal Kulzer, Boeblingen (DE); Roland Karrelmeyer, Bietigheim-Bissingen (DE); Christina Sauer, Friedrichshafen (DE)

(73) Assignee: Robert Bosch GmbH, Stuttgart (DE)

( * ) Notice: Subject to any disclaimer, the term of this patent is extended or adjusted under 35 U.S.C. 154(b) by 462 days.

(21) Appl. No.: 12/878,408

(22) Filed: Sep. 9, 2010

(65) Prior Publication Data

US 2011/0066355 A1 Mar. 17, 2011

(30) Foreign Application Priority Data

Sep. 11, 2009 (DE) .................. 10 2009 029 383

(51) Int. Cl.
*F02B 17/00* (2006.01)
*F02B 15/00* (2006.01)

(52) U.S. Cl.
USPC .......................................... 701/103; 123/295

(58) Field of Classification Search
USPC ................. 701/103, 104, 105, 108, 109, 110; 123/295, 430, 90.15, 568.14, 568.11
See application file for complete search history.

(56) References Cited

U.S. PATENT DOCUMENTS

| | | | | |
|---|---|---|---|---|
| 6,742,494 B2* | 6/2004 | Unger et al. | ................... | 123/305 |
| 7,093,568 B2* | 8/2006 | Yang | ........................... | 123/27 R |
| 7,412,322 B1* | 8/2008 | Rask et al. | .................... | 701/104 |
| 7,966,991 B2* | 6/2011 | Kang et al. | .................... | 123/305 |
| 2007/0272203 A1* | 11/2007 | Sloane et al. | ................. | 123/295 |
| 2008/0243356 A1* | 10/2008 | Kang et al. | .................... | 701/102 |
| 2008/0302329 A1* | 12/2008 | Sloane et al. | ................. | 123/299 |
| 2010/0174468 A1* | 7/2010 | Surnilla et al. | ................ | 701/103 |
| 2010/0235068 A1* | 9/2010 | Brewster et al. | ............. | 701/103 |

FOREIGN PATENT DOCUMENTS

DE 10 2006 041 467 3/2007

* cited by examiner

*Primary Examiner* — Mahmoud Gimie
(74) *Attorney, Agent, or Firm* — Merchant & Gould P.C.

(57) ABSTRACT

Suggested is a procedure for operating a self-igniting Otto engine (OM) with at least one inlet valve (14), with one or several variably controllable outlet valves (15), with a sensor (21) for a continuous detection of an air-fuel-ratio ($\lambda$) of the Otto engine (OM) and with a sensor (22) for detecting an engine speed n of the Otto engine (OM), whereby the fuel is directly injected into at least one combustion chamber (10) and whereby the Otto engine (OM) is operated in such a way, that a desired combustion focus ($MFB_{50\%set}$) is adjusted. The procedure is thereby characterized, in that the self-igniting moment of the fuel is influenced by an injection moment depending on a combustion focus ($MFB_{50\%set}$). An independent claim relates to a control unit that is customized for controlling the process of the procedure.

9 Claims, 3 Drawing Sheets

PROCEDURE AND CONTROL UNIT FOR OPERATING A SELF-IGNITING OTTO ENGINE

This application is claims benefit of Serial No. 10 2009 029 383.3, filed 11 Sep. 2009 in Germany and which application is incorporated herein by reference. To the extent appropriate, a claim of priority is made to the above disclosed application.

BACKGROUND

Such subjects are already known from the application DE 10 2006 041 467 A1. That application describes a procedure for operating a combustion engine, at which fuel is directly injected into a cylinder and chemically converted with air. The combustion of the fuel takes place by an Otto-motoric self-igniting procedure.

The Otto-motoric self-ignition (controlled auto ignition—CAI) provides a high potential for a fuel consumption reduction at simultaneously low emissions in partial load. This combustion procedure is therefore intensively examined at this point of time. A homogenous air-fuel-mixture is compressed at the Otto-motoric self-ignition. It ignites itself as soon as a sufficiently high temperature and a corresponding pressure in the combustion chamber are achieved.

The temperature of the mixture that is required for the self-ignition of the air-fuel-mixture is achieved by retaining hot remaining gas from the previous working cycle in the cylinder. Such an exhaust gas retaining is thereby achieved, in that a variably controllable outlet valve of the cylinder is closed long before reaching the gas change upper dead point and in that the hot remaining gas in the cylinder is compressed. The inlet valve opens for the fresh air supply only when there is inlet manifold pressure in the cylinder in order to avoid load losses.

The application DE 10 2006 041 467 A1 describes a regulation concept, at which the self-ignition of the air-fuel-mixture is controlled by a variable separation of the fuel amount that has to be injected into a cylinder during one work cycle to a pre-injection and a main injection. The pre-injection takes place before the upper dead point of the gas change, and the main injection takes place during the subsequent suction phase. The temperature of the cylinder filling that is achieved at the end of the subsequent compression increases according to DE 10 2006 041 467 A1 with an increasing rate of the pre-injection. A difference of ca. 60 K has been observed in the compression end temperature at the variation of the rate of the pre-injection between 0% and 10%.

For controlling the combustion the regulator concept of DE 10 2006 041 467 A1 provides a combination of a regulator for the induced average pressure, a lambda regulator and a regulator for the combustion position.

The regulator for the induced average pressure emits the main injection duration as correcting variable and therefore the fuel amount that is injected with the main injection. The load is regulated by this correcting variable. In other words: The desired torque is adjusted by the correcting variable.

The lambda regulator processes the signal of a lambda probe into a correcting variable, with which the phase position of an intake camshaft and therefore the remaining gas rate in the cylinder can be adjusted.

The regulator for the combustion position works with the 50% conversion point of the heating course as input variable. At a position of the 50% conversion point that is too late the pre-injection duration is increased, while it is lowered if the position is too early. The position of the 50% conversion point is derived from the cylinder individual combustion chamber information, which is provided by the cylinder individual cylinder pressure sensors or ion current sensors.

SUMMARY

Based on the state of the art the present invention is based on the task to adjust an efficiency-optimized operation of the Otto engine as simply as possible by an profitable way by using a mixture composition that is as lean as possible, whereby the self-igniting temperature has to be provided and the combustion position has to be optimized.

The combustion focus $MFB_{50\%}$ means thereby the point of time, at which 50% of the fuel has been combusted. Thereby, in that an estimated value $MFB_{50\%\lambda}$ a is determined for the combustion focus $MFB_{50\%}$ depending on the air-fuel-ratio $\lambda$ of the Otto engine and on the engine speed n of the Otto engine, cylinder individual pressure- and/or ion current sensors, as they are required by DE 10 2006 041 467 A1, can be omitted. The air-fuel-ratio $\lambda$ is determined from the exhaust gas of the Otto engine with the aid of an already present lambda probe. The engine speed n of the Otto engine is usually also determined by an already present engine speed sensor. Therefore the actual combustion focus can be determined with the aid of measuring values of the lambda probe or the engine speed sensor that are determined anyway and no additional sensors are required. The invention allows therefore a multiple ignition of the sensors that are present anyway for determining the combustion focus $MFB_{50\%}$.

Advantageously an engine map is used for determining the combustion focus $MFB_{50\%}$.

According to a preferred embodiment of the invention the self-igniting moment of the fuel is influenced by an interference of an injection beginning depending on an estimated value $MFB_{50\%\lambda}$ a for the combustion focus $MFB_{50\%}$.

Advantageously the valve actuator of the at least one outlet valve is influenced depending on the air-fuel-ratio $\lambda$ of the Otto engine.

Preferably a point of time is regulated, which is based on a piston movement and at which the outlet valve is closed, depending on the air-fuel-ratio $\lambda$ of the Otto engine.

The regulation allows therefore the adjustment of a desired air-fuel-ratio in a cylinder of the Otto engine, by providing the beginning and/or the end of the closing process of the outlet valve of the corresponding cylinder at a continuous opening process. The closing process of the outlet valve is thereby controlled in such a way, that it is ended by the piston before reaching the upper dead point. Thereby a part of the hot exhaust gas remains in the cylinder and is additionally compressed, whereby the temperature of the mixture, which is build by the subsequent fresh air supply over the opened inlet valve and the fuel injection, is increased.

Preferably a pre-controlling is used for a faster adjustment of a default air-fuel-ratio $\lambda$ in the course of a regulation.

BRIEF DESCRIPTION OF THE DRAWINGS

A preferred embodiment of the present invention is subsequently further explained with the aid of figures. It is shown in.

DETAILED DESCRIPTION

Figure 1:
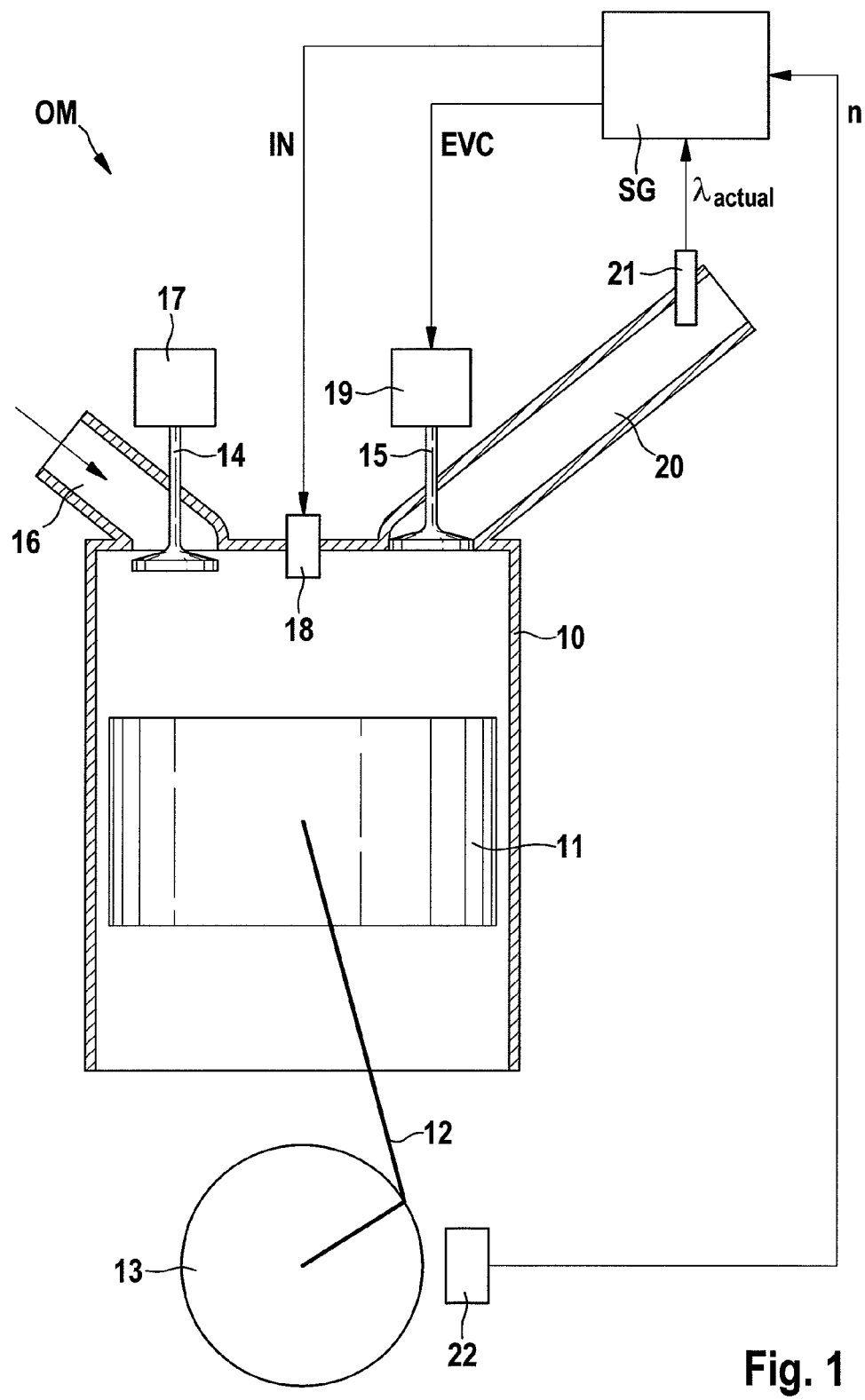
FIG. 1 a schematic overview of actuators and sensors that are part of the procedure according to the invention, FIG. 2 a diagram with a pressure course in a cylinder of a self-igniting Otto-engine with a negative valve overlapping and FIG. 3 a block circuit diagram with a regulating concept according to the invention for adjusting the combustion focus.
Figure 2:
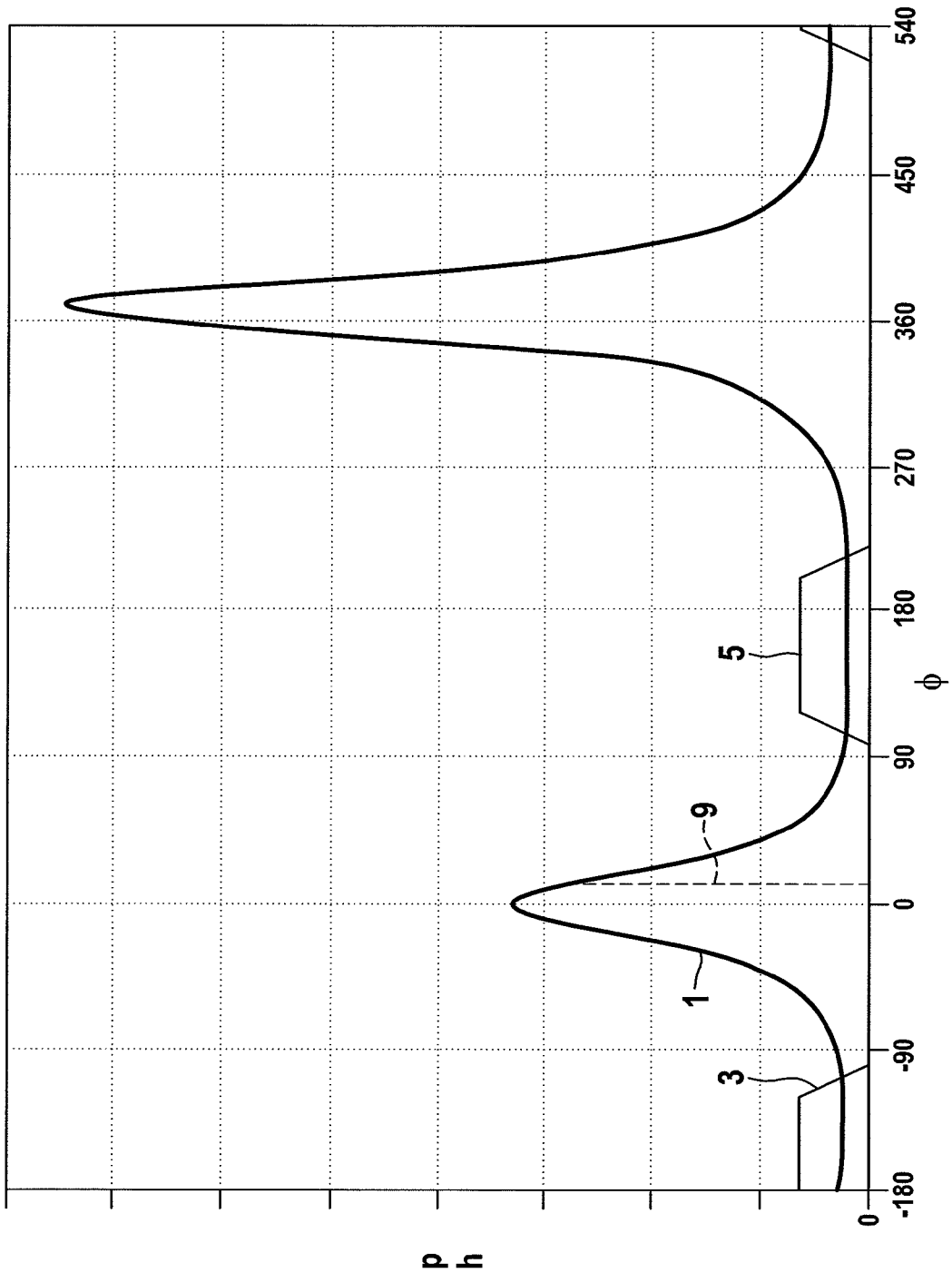

FIG. 1 provides the components, which work together in a self-igniting Otto engine OM in the range of the first procedure according to the invention, as well as the corresponding data stream. A piston 11 of a cylinder 10 actuates a crankshaft 13 of the Otto engine OM by a piston rod 12. Fresh air is sucked into the cylinder 10 through an air inlet duct 16, whereby the fresh air gets in by an inlet valve 14, whose control times are preset by an inlet valve actuator 17. An injector 18 injects fuel into the cylinder 10 upon a command IN of a control unit SG, so that an air-fuel mixture is created, which combusts subsequently and actuates the piston 11 thereby. Exhaust gas that is created hereby is emitted out of the cylinder 10 over an exhaust duct 20. The exhaust gas emission is controlled by an outlet valve 15, which is controlled by an outlet valve actuator 19. The outlet valve actuator 19 receives therefore in particular a closing signal EVC (exhaust valve closing) from the control unit SG, with which a previously opened outlet valve is closed. A lambda probe 21 determines the air fuel ratio λ of the mixture in the emitted exhaust gas and transfers a corresponding measuring value $\lambda_{actual}$ to the control unit SG. Furthermore the control unit SG receives the actual engine speed n of the Otto engine OM, which is detected by an engine speed sensor 22. Apart from that the control unit SG is customized, in particular programmed, to control the course of the procedure that is suggested here and/or of its embodiments. The interaction of the individual components in the range of a self-igniting combustion procedure is subsequently described in detail with the aid of FIG. 2. FIG. 2 shows a cylinder pressure course 1 as a diagram in the range of the self-igniting combustion procedure of the four-stroke Otto engine OM depending on a crankshaft angle φ (horizontal axis). The diagram of FIG. 2 shows furthermore a valve stroke 5 of the inlet valve 14 and a valve stroke 3 of the outlet valve 15, both also depending on the crankshaft angle φ. The vertical axis shows qualitatively the pressure p as well as the valve stroke h. The self-igniting combustion procedure that is shown in FIG. 2 comprises four strokes, which can each be assigned to different angle positions: suction stroke (0°-180°), compression stroke (180°-360°), working stroke (360°-540°) and emission stroke (−180°-0°). At the beginning of the suction stroke an injection of fuel into the compressed and hot remaining in the cylinder 10 takes place at a crankshaft angle value that is labeled with the reference sign 9. If there is an inlet manifold pressure in the cylinder 10, the inlet valve 14 is opened in order to suck in fresh air. In the range of the subsequent compression stroke the inlet valve 14 of the cylinder 10 is initially closed and subsequently the air-fuel remaining gas mixture that is present in the cylinder 10 is compressed. By this compression procedure the temperature of the mixture increases until the ignition temperature is reached at the end of the compression stroke. The mixture begins to ignite almost simultaneously in the entire combustion chamber 10, whereby a flame front that runs through the mixture is avoided. Because the heat release takes place without high local temperatures the production of thermal nitric oxide is drastically reduced. Even after the piston 11 of the cylinder 10 has passed the upper dead point at φ=360° the combustion procedure increases the cylinder pressure further, so that a maximum pressure adjusts upon the piston 11 shortly after the beginning of the work stroke at a crankshaft angle φ of a little over 360°. Just before the end of the work stroke the outlet valve 15 is opened at a crankshaft angle φ of a little less than 540° and the majority of the hot exhaust gas is subsequently emitted from the cylinder 10 through the outlet valve 15. The outlet valve 15 is closed during the emission stroke at a crankshaft angle φ of about −90°. The closing takes therefore place significantly before the point of time, at which the piston 11 reaches the upper dead point at φ=0. For this reason a part of the heated exhaust gas remains as remaining gas in the cylinder 10.

It is important for the described exhaust gas maintenance procedure that the temperature level is increased for the subsequent mixture by the exhaust gas maintenance in the cylinder 10, so that a temperature of about 1.000 Kelvin is reached in the cylinder at the end of the compression stroke that is required for the self-ignition of usual gasoline fuels.

The invention suggests a regulation for optimizing the combustion position of the above described self-igniting combustion procedure (FIG. 2). The regulation fulfills thereby two functions: on the one hand it adjusts a required air-fuel-ratio λ by regulating a point of time that is based on the piston movement, at which the outlet valve 15 is closed while the opening of the outlet valve 15 remains the same. On the other hand it regulates the point of time of the injection and therefore the beginning of the combustion (self-ignition moment) as well as the position of a combustion focus $MFB_{50\%}$ that comes along with the self-ignition moment. The regulation is preferably realized in the control unit SG.

Figure 3:
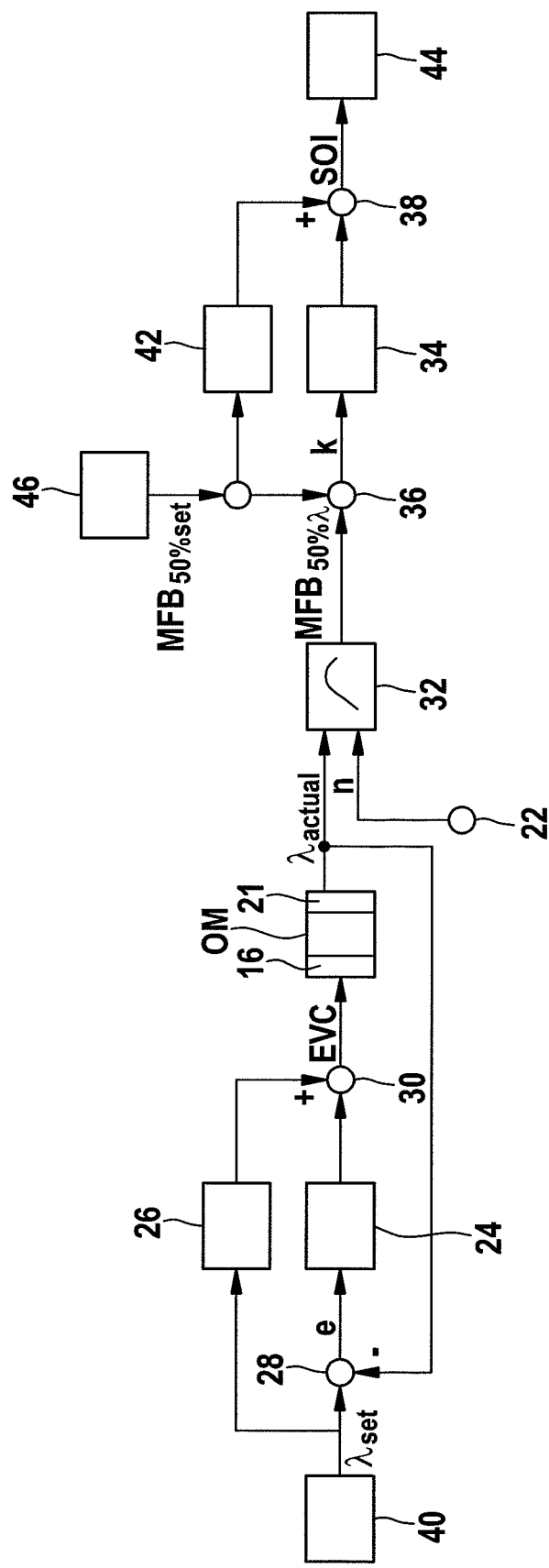

FIG. 3 shows the regulation according to the invention as a block circuit diagram. The input value of the regulation is a default air-fuel-ratio $\lambda_{set}$, which is created by a nominal value default 40. In order to achieve an optimal efficiency of the combustion process a mixture composition has to be sought that is as lean as possible, which means λ>1. There are several possibilities for this purpose: the air-fuel-ratio λ can be influenced on the one hand by the control times of the outlet valve 15, on the other hand by the injection amount of fuel. The regulation according to the invention is based on a nominal value of a torque moment, for whose production a pre-determined fuel mass is required. Therefore the desired (fresh) air-fuel-ratio) $\lambda_{set}$ is not adjusted by a change of the fuel percentage at combustion chamber fillings, but by a change of the fresh air percentage. The fresh air percentage arises thereby as a result of an adjustment of the remaining gas percentage, thus by the amount of the retained exhaust gas from the previous work cycle, which is influenced by a controlling of the closing moment of the outlet valve 15.

In order to achieve a mixture composition that is as lean as possible a λ-regulator 24 initially generates a first control intervention depending on a control deviation e between the nominal value $\lambda_{set}$ and the actual value $\lambda_{actual}$. This first control intervention is created by the λ-regulator 24 in such a way that the control deviation e is minimized. The first control intervention is impinged by the connection 30 with a first basic value, which a pre-control 26 determines depending on $\lambda_{set}$. The basic value results for example from a default dependency on the nominal value $\lambda_{set}$ that is stored in the control unit SG. The basic value that is connected to the first control intervention creates the correcting variable EVC, which is supplied to the outlet valve actuator 19 of the Otto engine OM and which causes a closing of the outlet valve 15. The λ-regulator 24 optimizes the closing process of the outlet valve 15 in such a way that the air value of the air-fuel-mixture that is enclosed in the cylinder of the Otto engine OM is approaching the nominal value. The nominal value is preferably pre-determined in such a way that its adjustment provides a secure achievement of the self-ignition temperature. Therefore a certain minimum amount of hot remaining gas has to remain in the cylinder 10, which results from an over-stoichiometric (lambda>1) combustion chamber filling of the previous working cycle and which still contains oxygen. The λ-regulator 24 determines therefore the corresponding correcting variable EVC. In the range of the regulation the actual air ratio $\lambda_{actual}$ is also determined by the lambda probe 21 with the aid of the exhaust gas that has been emitted by the Otto engine OM. The value $\lambda_{actual}$ is subtracted from the nominal air ratio $\lambda_{set}$ over a feedback-loop by a connection 28, whereby the difference is provided to the regulator λ-regulator 24 as control deviation e.

Due to the change of the air-fuel-ratio λ, which takes place with the aid of a change of the air percentage as opposed to the constant fuel percentage of the mixture, also the temperature of the mixture changes with the heated remaining gas percentage. The point of time changes, at which the self-igniting temperature in the compression phase is reached and/or exceeded, also changes thereby. This point of time marks the beginning of the combustion of the cylinder filling. Depending on the beginning of the combustion the combustion position changes and the combustion focus $MFB_{50\%}$ moves. If the combustion focus $MFB_{50\%}$ does not correspond with the default combustion focus $MFB_{50\%set}$ (anymore), a correction of the combustion position has to be carried out. For this purpose the actual combustion focus has to be determined It can be estimated indirectly without additional aid depending on the actual air-fuel-ratio $\lambda_{actual}$ and on the actual engine speed n of the Otto engine OM. In one embodiment the estimation takes place by an access to an engine map 32, in which values $MFB_{50\%\lambda}$ are stored and which is addressed with the actual air-fuel-ratio $\lambda_{actual}$ and the nominal engine speed n. Depending on the estimated $MFB_{50\%\lambda}$ value a correction of the combustion position takes then place by a change of the injection moment.

For this purpose a regulator MFB50%-regulator 34 contains a control deviation k as input signal, which is created by a connection 36 between the estimated value $MFB_{50\%\lambda}$ and a nominal combustion focus $MFB_{50\%set}$, which is provided by a nominal value default 46. The estimated value $MFB_{50\%\lambda}$ represents an actual value for the regulation. The MFB50%-regulator 34 generates a second control intervention from the control deviation k for the adjustment of the injection moment, which is created in such a way that the control deviation k is minimized. The second control intervention is connected in a connection 38 to a second basic value, which is created by the pre-control 42 depending on the default nominal value $MFB_{50\%set}$ of the combustion focus. The second basic value that is connected to the second control intervention creates a value SOI (start of injection) for an actuator system 44, which activates the injection by the injector 18 depending on the SOI.

A significant condition for a dynamic adjustment of the combustion focus $MFB_{50\%}$ is a quick detection of the actual air-fuel-ratio $\lambda_{actual}$ with whose aid the actual combustion focus can be estimated. In one embodiment an injection takes place not until the suction stroke and/or compression stroke, so that the remaining gas cannot ignite by the intermediate compression at the end of the exhaust stroke, whereby the subsequently adjusting temperature of the mixture would be influenced.

A further embodiment provides one or also two injections in the load change stroke and/or compression stroke, in order to increase the overall injected fuel amount. The load change stroke means thereby the intermediate compression phase at closed valves 14 and 15. It is furthermore possible that the correcting variables EVC and SOI are not directly supplied to the corresponding actuators, but over a central control unit, which controls the actuators.

The invention allows thereby an efficiency optimized operation of the Otto engine OM at a mixture composition that is as lean as possible by on the actual values of the air-fuel-ratio $\lambda_{actual}$ and the engine speed n, which are transferred to a control unit SG anyway, whereby the combustion focus is optimized by adjusting the injection moment.

The invention claimed is:

1. Procedure for operating a self-igniting Otto engine with at least one inlet valve, with one or several variably controllable outlet valves, with a sensor for a continuous detection of an actual air-fuel-ratio of the Otto engine and with a sensor for detecting an engine speed n of the Otto engine, the procedure comprising:
   directly injecting the fuel into at least one combustion chamber;
   determining an estimated value for a combustion focus depending on the actual air-fuel-ratio of the Otto engine, a predetermined air-fuel-ratio, and on the engine speed n of the Otto engine; and
   adjusting the combustion focus based on the estimated value for the combustion focus.

2. The procedure according to claim 1, wherein an engine map is used for determining the estimated value for the combustion focus.

3. The procedure according to claim 1, further comprising influencing the self-igniting moment of the fuel by interfering with an injection beginning based on the estimated value for the combustion focus.

4. The procedure according to claim 1, further comprising influencing the valve actuator of the at least one outlet valve based on the actual air-fuel-ratio of the Otto engine.

5. The procedure according to claim 4, further comprising regulating a point of time, which is based on a piston movement and at which the outlet valve is closed, depending on the actual air-fuel-ratio of the Otto engine.

6. The procedure according to claim 5, further comprising using a pre-control for a faster adjustment of a default air-fuel-ratio in the course of a regulation.

7. The procedure according to claim 1, wherein determining the estimated value for the combustion focus depending on the actual air-fuel-ratio of the Otto engine, the predetermined air-fuel-ratio, and on the engine speed of the Otto engine, comprises determining the estimated value based only on the actual air-fuel-ration, the predetermined air-fuel-ratio, and the engine speed.

8. The procedure according to claim 1, wherein the predetermined air-fuel-ratio is such that auto ignition is guaranteed.

9. Control unit for operating a self-igniting Otto engine with at least one inlet valve, with one or several variably controllable outlet valves, with a sensor for a continuous detection of an actual air-fuel-ratio of the Otto engine and with a sensor for detecting an engine speed n of the Otto engine, whereby the fuel is directly injected into at least one combustion chamber and whereby the Otto engine is operated in such a way, that a desired combustion focus is adjusted, wherein the control unit is operative to:
   determine an estimated value for the combustion focus depending on the actual air-fuel-ratio of the Otto engine, a predetermined air-fuel-ratio, and on the engine speed of the Otto engine; and
   adjust the combustion focus based on the estimated value for the combustion focus.

* * * * *